(12) United States Patent
Sarault et al.

(10) Patent No.: US 12,420,905 B2
(45) Date of Patent: Sep. 23, 2025

(54) MODULAR AIRCRAFT FLOORBOARD RISER SYSTEMS AND METHODS

(71) Applicant: The Boeing Company, Arlington, VA (US)

(72) Inventors: Mark W. Sarault, Lake Stevens, WA (US); Jason P. Dutter, Arlington, WA (US); Mary E. Phillips, Everett, WA (US); Richard L. Steidle, Lake Stevens, WA (US)

(73) Assignee: The Boeing Company, Arlington, VA (US)

( * ) Notice: Subject to any disclaimer, the term of this patent is extended or adjusted under 35 U.S.C. 154(b) by 89 days.

(21) Appl. No.: 18/393,103

(22) Filed: Dec. 21, 2023

(65) Prior Publication Data

US 2025/0206434 A1 Jun. 26, 2025

(51) Int. Cl.
*B64C 1/18* (2006.01)
*B64F 5/10* (2017.01)

(52) U.S. Cl.
CPC . *B64C 1/18* (2013.01); *B64F 5/10* (2017.01)

(58) Field of Classification Search
CPC ................................ B64C 1/18; B64C 1/20
See application file for complete search history.

(56) References Cited

U.S. PATENT DOCUMENTS

| | | | | |
|---|---|---|---|---|
| 3,363,381 | A * | 1/1968 | Forrest | B62D 25/2054 |
| | | | | 52/584.1 |
| 4,929,133 | A * | 5/1990 | Wiseman | B64C 1/20 |
| | | | | 410/67 |
| 7,338,013 | B2 | 3/2008 | Vetillard et al. | |
| 9,481,467 | B2 * | 11/2016 | Oleson | B64C 1/18 |
| 9,688,381 | B2 * | 6/2017 | Fink | B64C 1/062 |
| 10,875,649 | B2 * | 12/2020 | Brown | B64D 11/04 |
| 11,220,347 | B2 | 1/2022 | Huebner et al. | |
| 2006/0231681 | A1 * | 10/2006 | Huber | B64C 1/20 |
| | | | | 244/119 |

(Continued)

FOREIGN PATENT DOCUMENTS

EP 2889222 A1 7/2015

OTHER PUBLICATIONS

European Patent Office, Extended European Search Report in related application EP24215424, Apr. 8, 2025.

*Primary Examiner* — Brian M O'Hara
(74) *Attorney, Agent, or Firm* — Kolitch Romano Dascenzo Gates LLC

(57) ABSTRACT

Modular aircraft floorboard riser systems are provided for assembling an aircraft floorboard riser for operatively elevating a to-be-elevated floorboard above adjacent floorboards of an aircraft floor. Modular aircraft floorboard riser systems comprise a plurality of riser panels. Each riser panel comprises a first panel portion having a first-panel-portion outer edge region, and a second panel portion slidingly coupled to the first panel portion and having a second-panel-portion outer edge region opposite the first-panel-portion outer edge region. The first-panel-portion outer edge region of each riser panel is configured to be selectively coupled to the second-panel-portion outer edge region of another riser panel, such that a selection of the plurality of riser panels is configured to be operatively assembled into the aircraft floorboard riser having a polygonal shape.

21 Claims, 14 Drawing Sheets

(56) References Cited

U.S. PATENT DOCUMENTS

2008/0156233 A1\* 7/2008 Paddock ................ B63B 29/06
                                                     108/44
2024/0109641 A1\* 4/2024 Mänz ........................ B64C 1/20

\* cited by examiner

MODULAR AIRCRAFT FLOORBOARD RISER SYSTEMS AND METHODS

FIELD

The present disclosure relates to aircraft construction and maintenance.

BACKGROUND

During aircraft construction and maintenance, floorboards may need to be removed to access and work on sub-floor structures. In some instances, tooling may be required to extend upward through the floor opening during such construction or maintenance. In such situations, floorboards cannot be replaced while technicians take a break, retrieve tools, change shifts, etc.

SUMMARY

Modular aircraft floorboard riser systems are provided for assembling an aircraft floorboard riser for operatively elevating, or supporting, a to-be-elevated floorboard above adjacent floorboards of an aircraft floor, for example to cover a floor opening while providing vertical clearance for tooling that extends through the floor opening, to provide a low barricade and/or visual indicator that floor maintenance is in progress, and so forth. Modular aircraft floorboard riser systems comprise a plurality of riser panels. Each riser panel comprises a first panel portion having a first-panel-portion outer edge region, and a second panel portion slidingly coupled to the first panel portion and having a second-panel-portion outer edge region opposite the first-panel-portion outer edge region. The first-panel-portion outer edge region of each riser panel is configured to be selectively coupled to the second-panel-portion outer edge region of another riser panel, such that a selection of the plurality of riser panels is configured to be operatively assembled into the aircraft floorboard riser having a polygonal shape, for example to conform to the shape of the to-be elevated floorboard.

DESCRIPTION

Figure 1:
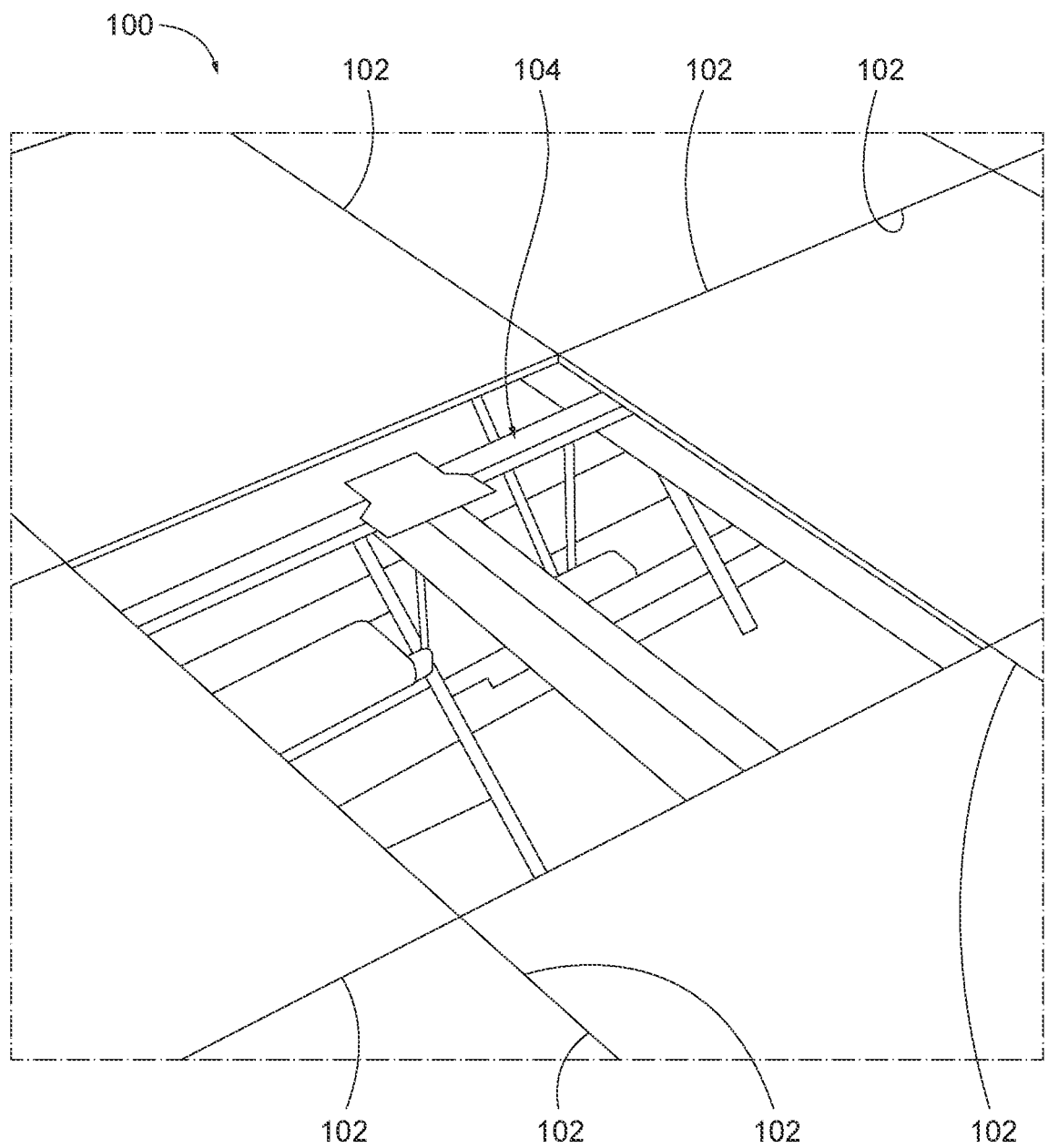
FIG. 1 is an illustration of an example aircraft floor with a floorboard removed, revealing structure beneath the aircraft floor.
Figure 2:
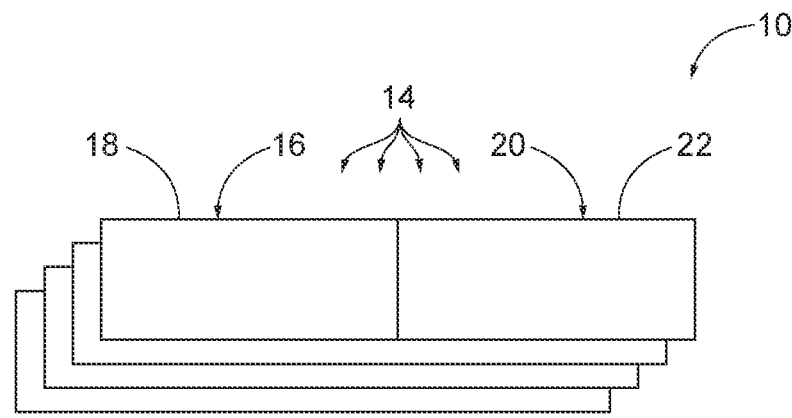
FIG. 2 is a schematic illustration representing modular floorboard riser systems according to the present disclosure.
Figure 3:
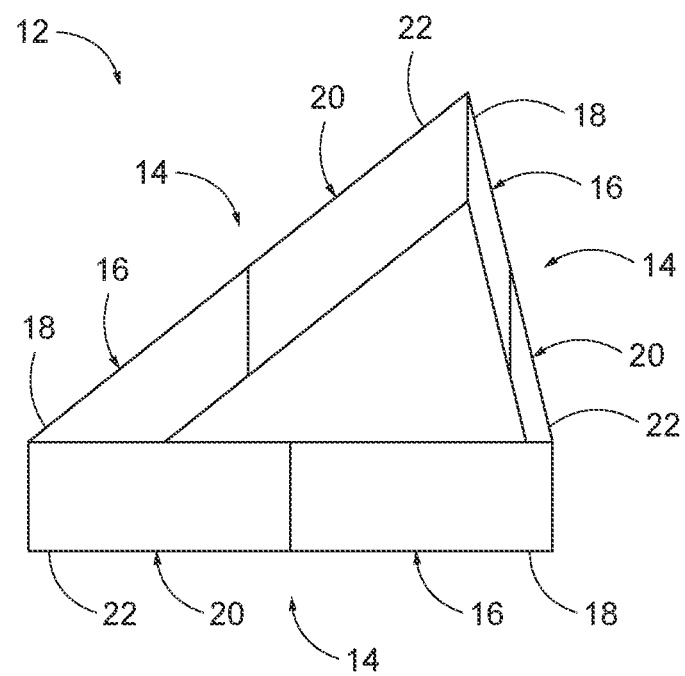
FIG. 3 is a schematic illustration representing an example of an aircraft floorboard riser assembled from a modular floorboard riser system according to the present disclosure.
Figure 4:
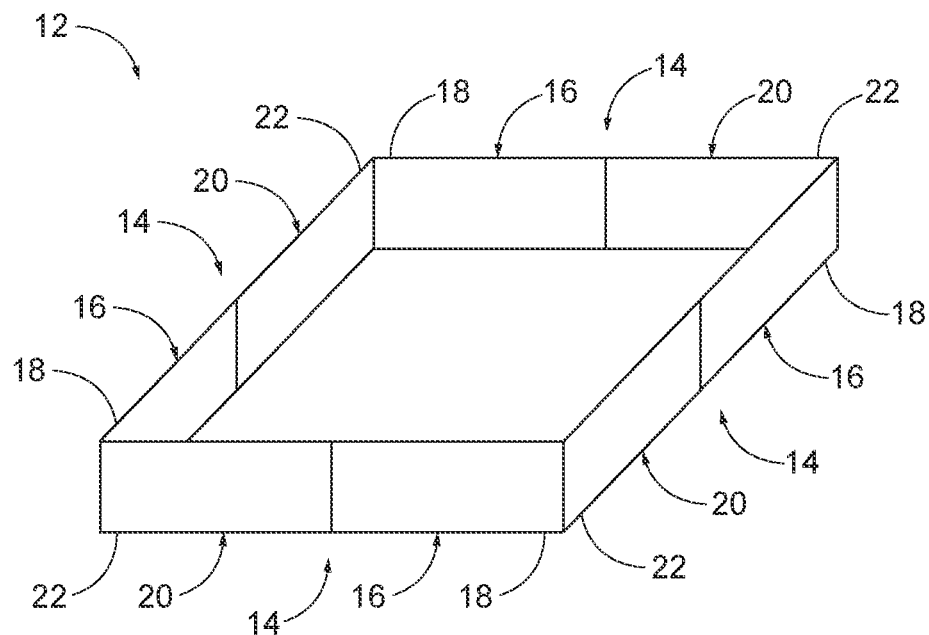
FIG. 4 is a schematic illustration representing an example of another aircraft floorboard riser assembled from a modular floorboard riser system according to the present disclosure.
Figure 5:
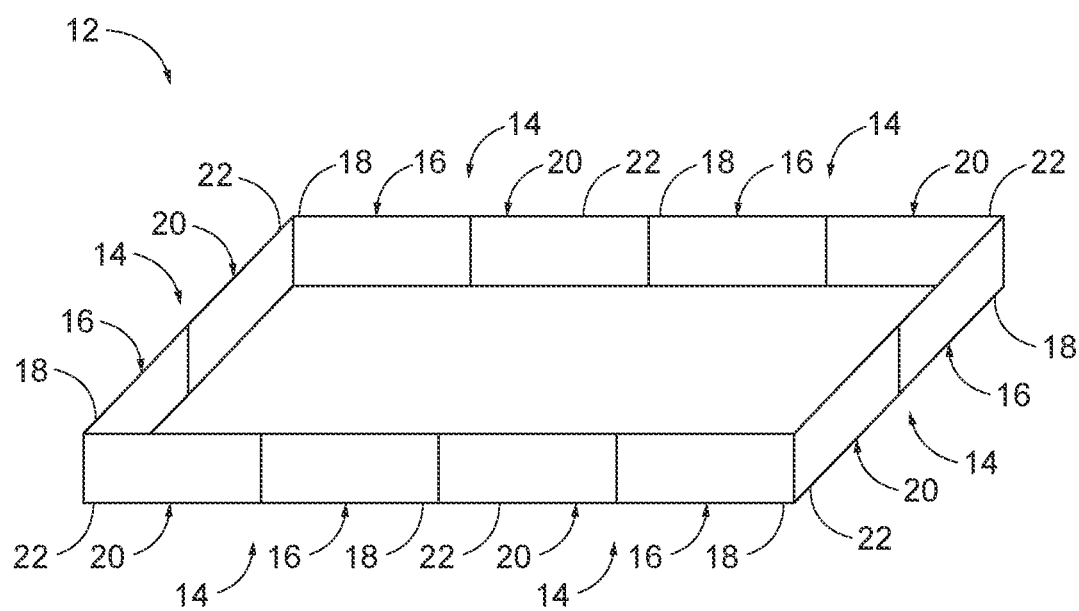
FIG. 5 is a schematic illustration representing an example of another aircraft floorboard riser assembled from a modular floorboard riser system according to the present disclosure.

With initial reference to FIG. 1, an example aircraft floor 100 is represented with one floorboard 102 having been removed to reveal a floor opening, or void 104. FIG. 2 schematically illustrates modular aircraft floorboard riser systems 10 for assembling aircraft floorboard risers 12, examples of which are represented in FIGS. 3-5, for operatively elevating a to-be elevated floorboard 102 above adjacent floorboards 102 of an aircraft floor 100.

As schematically represented in FIG. 2, modular aircraft floorboard riser systems 10 comprise a plurality of riser panels 14. While FIG. 2 schematically illustrates four such riser panels 14, any number of riser panels 14 may be provided in a modular aircraft floorboard riser system 10. As schematically represented, each riser panel 14 comprises a first panel portion 16 that has a first-panel-portion outer edge region 18, and a second panel portion 20 that is slidingly coupled to the first panel portion 16 and that has a second-panel-portion outer edge region 22 that is opposite the first-panel-portion outer edge region 18. The first-panel-portion outer edge region 18 of each riser panel 14 is configured to be selectively coupled to the second-panel-portion outer edge region 22 of another riser panel 14. Accordingly, a selection of riser panels 14 from an aircraft floorboard riser system 10 is configured to be operatively assembled into an aircraft floorboard riser 12 having a polygonal shape (for example to conform to the polygonal shape of a floor opening and/or a to-be elevated floorboard), such as the example aircraft floorboard risers 12 schematically represented in FIGS. 3-5. In some examples, the first panel portion 16 and the second panel portion 20 have substantially the same length.

In some examples, the first-panel-portion outer edge region 18 of each riser panel 14 is configured to be selectively coupled to the second-panel-portion outer edge region 22 of another riser panel 14 at plurality of angles. Accordingly, various polygonal shapes may be constructed utilizing a selection of riser panels 14. Thus, the system is configured to construct floorboard risers as needed for particular shapes of floor openings or to-be elevated floorboards, such as a floorboard riser that defines a triangular shape (an example of which is shown in FIG. 3), a square shape (as in FIG. 4), a rectangular shape (as in FIG. 5), and so forth. In other examples, the first-panel-portion outer edge region 18 of each riser panel 14 is configured to be selectively coupled to the second-panel-portion outer edge region 22 of another riser panel 14 at a single angle, such as at a right angle (90°). In these examples, only specific polygonal shapes may be constructed, such as right quadrilaterals in the instance of the riser panels 14 being limited to right angles between adjacently coupled riser panels 14, such as the example floorboard risers shown in FIG. 4 and FIG. 5. Such examples may be suitable for settings that consist only of floorboards having square or rectangular shapes.

Figure 6:
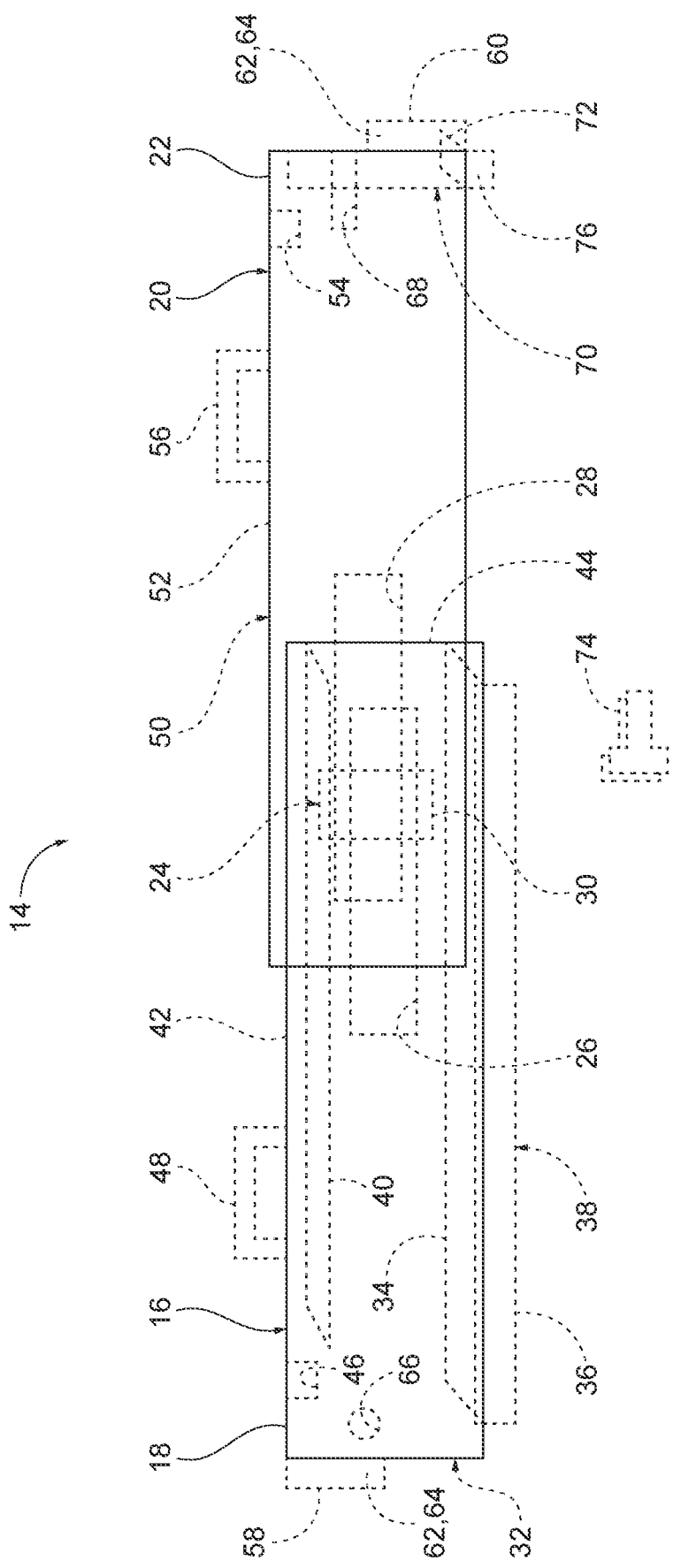
FIG. 6 is a schematic illustration representing riser panels of modular floorboard riser systems according to the present disclosure.
Figure 7:
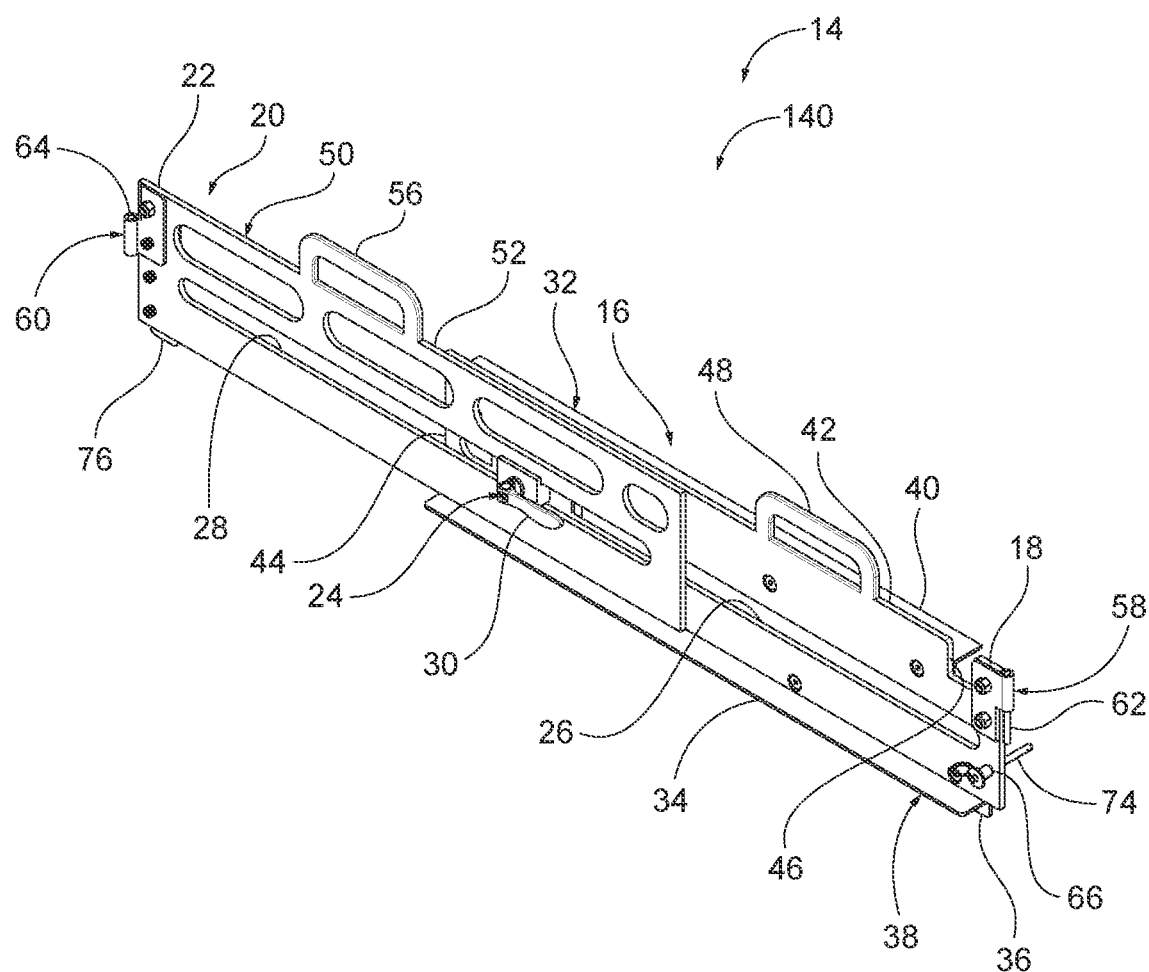
FIG. 7 is a front, top, left isometric view of an example riser panel according to the present disclosure.
Figure 8:
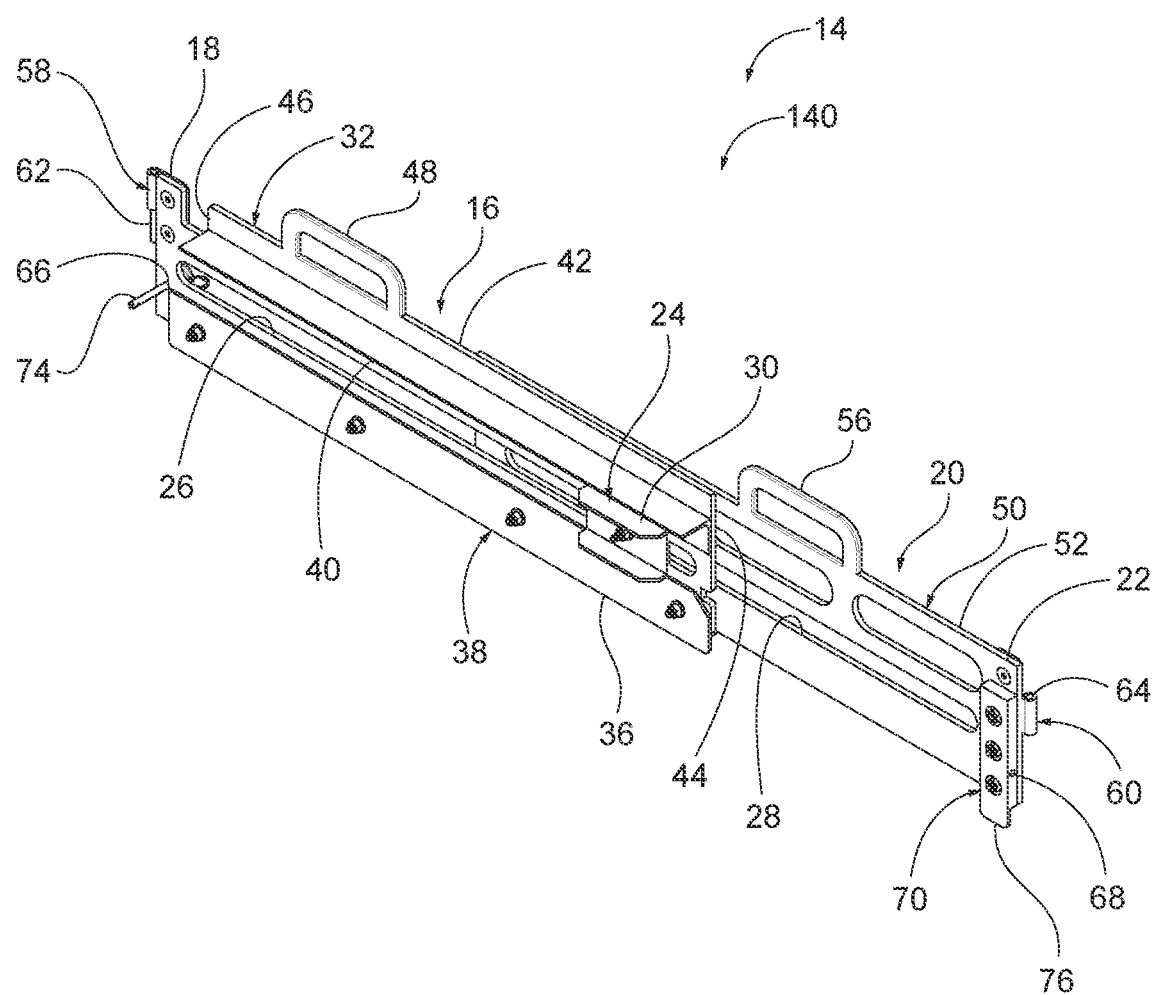
FIG. 8 is rear, top, right isometric view the example riser panel of FIG. 7.
Figure 9:
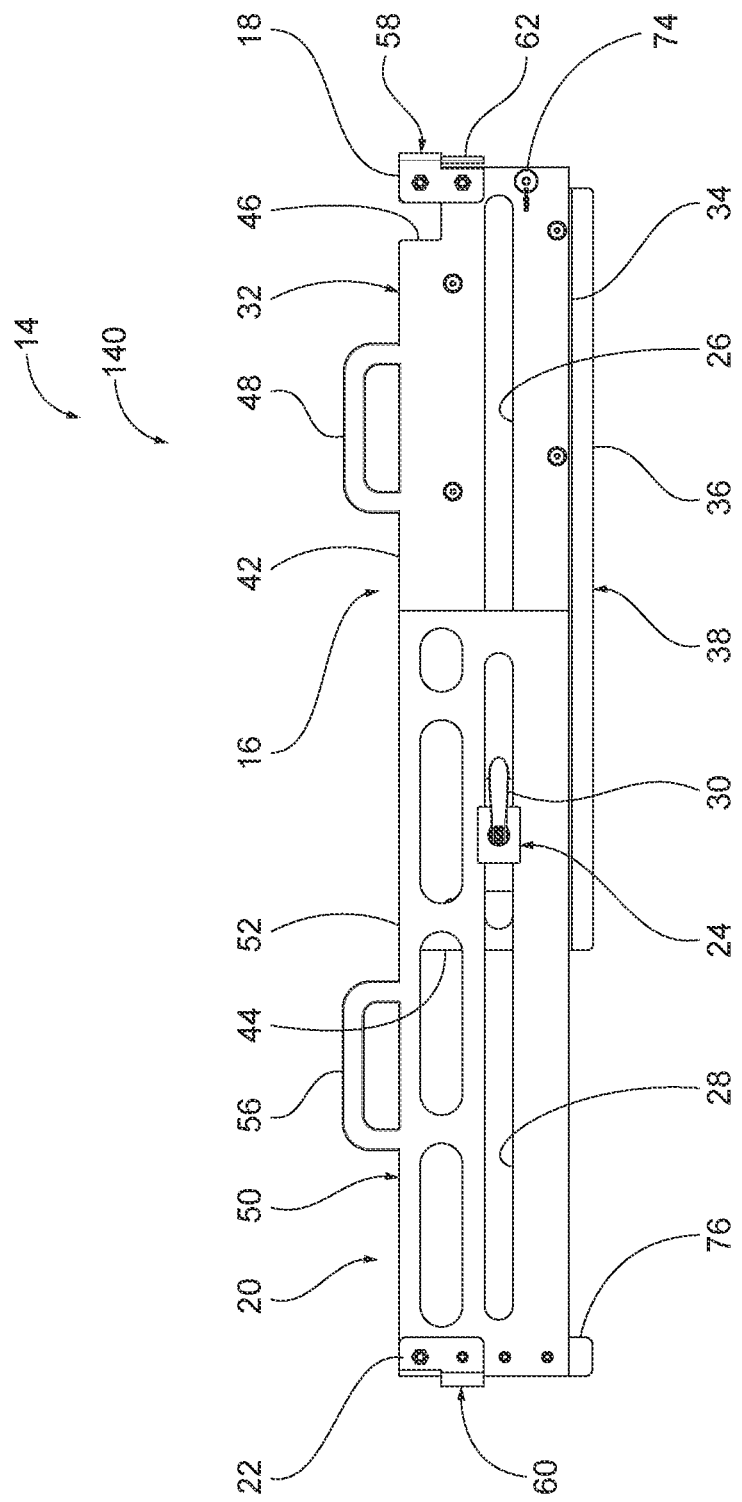
FIG. 9 is a front view of the example riser panel of FIG. 7.
Figure 10:
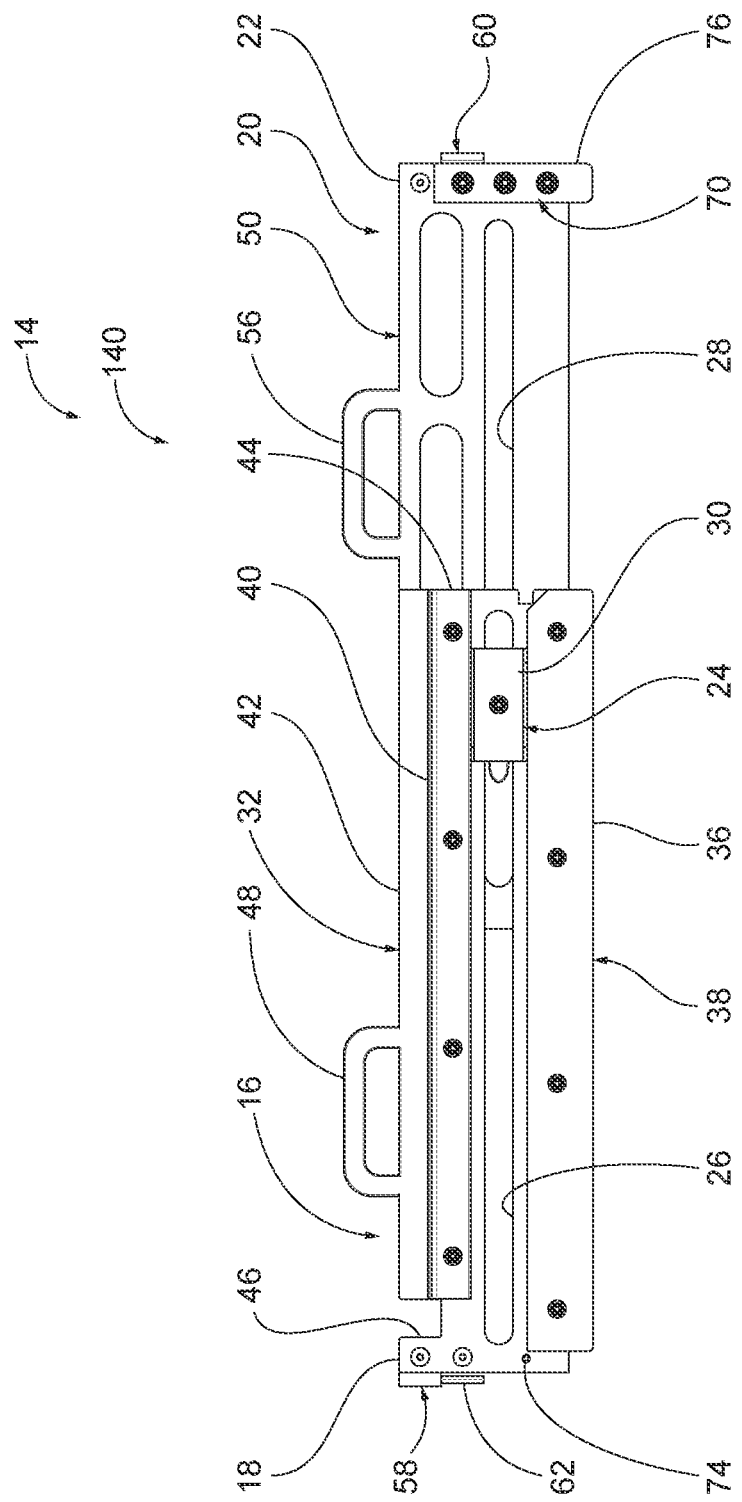
FIG. 10 is a rear view of the example riser panel of FIG. 7.
Figure 11:
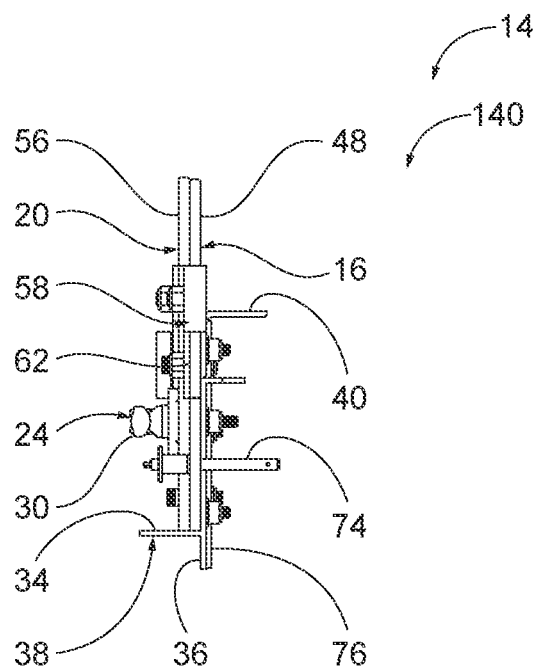
FIG. 11 is a left side view of the example riser panel of FIG. 7.
Figure 12:
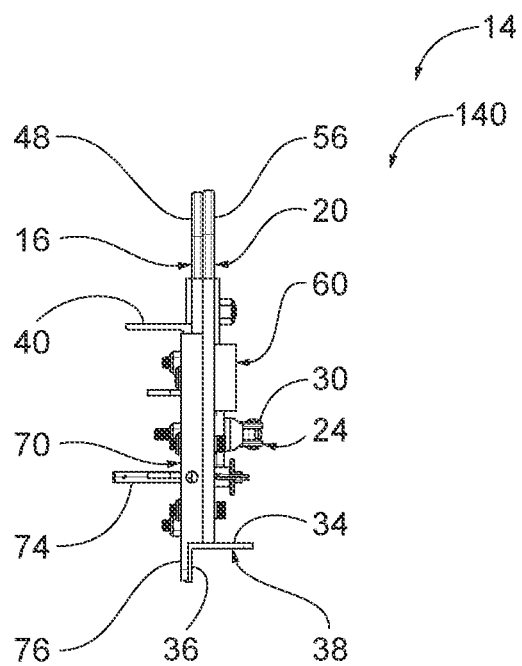
FIG. 12 is a right side view of the example riser panel of FIG. 7.
Figure 13:
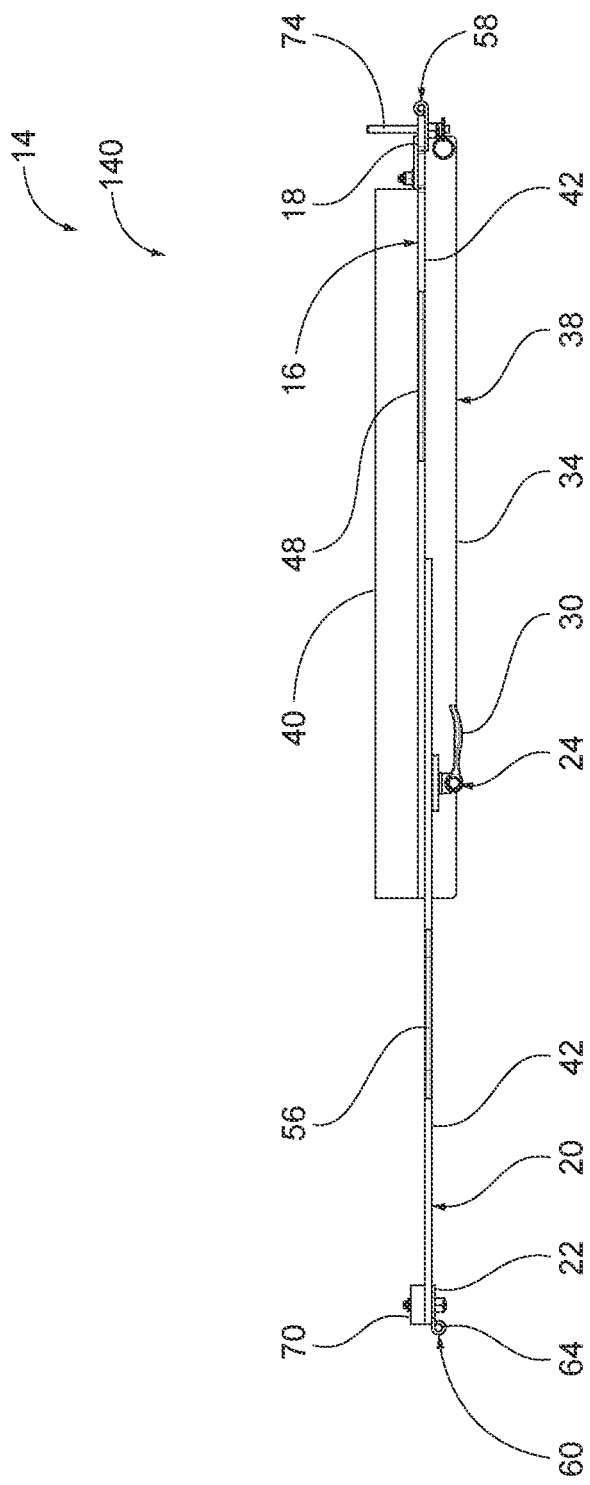
FIG. 13 is a top view of the example riser panel of FIG. 7.
Figure 14:
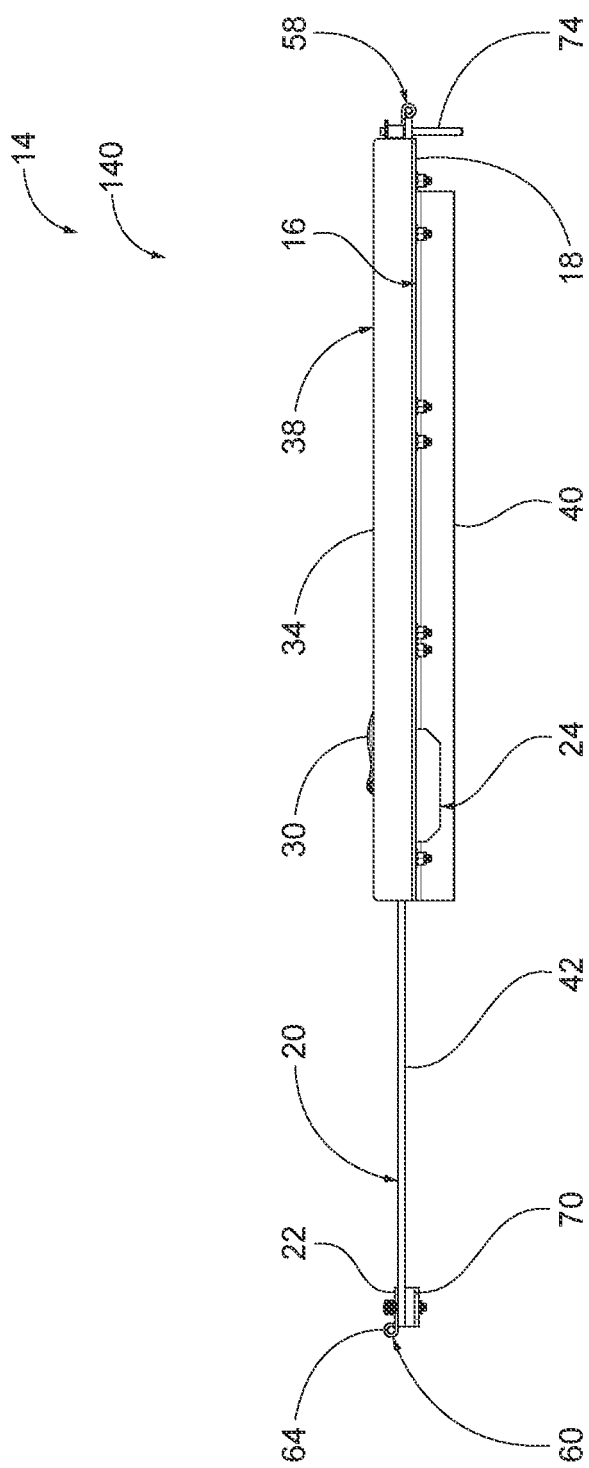
FIG. 14 is a bottom view of the example riser panel of FIG. 7.

Turning to FIG. 6, riser panels 14 of aircraft floorboard riser systems 10 are schematically represented. Generally, in FIG. 6, elements that are likely to be included in a given example are illustrated in solid lines, while elements that are optional to a given example or that correspond to a specific example are illustrated in broken lines. However, elements that are illustrated in solid lines are not essential to all examples of the present disclosure, and an element shown in solid lines may be omitted from a particular example without departing from the scope of the present disclosure.

As schematically represented in FIG. 6 and as noted above, each riser panel 14 comprises at least a first panel portion 16 and a second panel portion 20 that is slidingly coupled to the first panel portion 16. In some examples, each riser panel 14 further comprises a clamp 24 that is configured to selectively fix the second panel portion 20 relative to the first panel portion 16. Accordingly, an overall length of a riser panel 14 may be selected for operative use of the riser panel 14 when assembling an aircraft floorboard riser 12. In some such examples, the first panel portion 16 defines a first-portion longitudinal channel 26, the second panel portion 20 defines a second-portion longitudinal channel 28 that is parallel to the first-portion longitudinal channel 26, and the clamp 24 extends through the first-portion longitudinal channel 26 and the second-portion longitudinal channel 28 and engages opposing sides of the first panel portion 16 and the second panel portion 20. As an example, the clamp 24 may comprise a cam lever assembly 30 to facilitate easy adjustment of the overall length of a riser panel 14 by a technician; however, other configurations of clamps 24 also may be used.

As schematically represented in FIG. 6, in some examples, the first panel portion 16 comprises a first-portion main body 32 that is planar and substantially parallel to the second panel portion 20, and a first-portion lower ledge 34 that extends orthogonal from the first-portion main body 32 and that extends below the second panel portion 20. Herein, "substantially parallel" means within 10° of each other. The first-portion lower ledge 34 is configured to engage an upper surface of an adjacent floorboard 102 (see e.g., FIG. 16) when the aircraft floorboard riser 12 is operatively installed. In some such examples, the first-portion lower ledge 34 extends along a substantial length of the first-portion main body 32. Accordingly, a substantial length of the first-portion main body 32 will be supported directly by the first-portion lower ledge 34 and by the upper surface of a floorboard 102 when the aircraft floorboard riser 12 is operatively installed. Moreover, in examples where the first panel portion 16 and the second panel portion 20 are substantially the same length, due to the overlap between the first panel portion 16 and the second panel portion 20, the first-portion lower ledge 34 will span greater than 50% of an overall length of the riser panel 14. As a result, such a riser panel 14 will be securely supported atop a floorboard 102 when operatively installed.

With continued reference to FIG. 6, in some examples, the first panel portion 16 comprises the first-portion main body 32 and an elongate tab 36 that extends parallel and downward from the first-portion main body 32. In such examples, the elongate tab 36 is configured to engage an edge of one of the adjacent floorboards 102 when the aircraft floorboard riser 12 is operatively installed. In some such examples, in which the first panel portion 16 also comprises a first-portion lower ledge 34, the first-portion lower ledge 34 and the elongate tab 36 are integral with each other and are operatively coupled to the first-portion main body 32. As an example, the first-portion lower ledge 34 and the elongate tab 36 may comprise a T-extrusion 38 that is operatively coupled to the first-portion main body 32.

In some examples, the first panel portion 16 comprises the first-portion main body 32 and an upper ledge 40 that extends orthogonal from the first-portion main body 32. In such examples, the upper ledge 40 is configured to engage and support the to-be-elevated floorboard 102. In some such examples, in which the first panel portion 16 also comprises a first-portion lower ledge 34, the upper ledge 40 and the first-portion lower ledge 34 extend from opposite sides of the first-portion main body 32, and the upper ledge 40 is positioned spatially above the first-portion lower ledge 34. Accordingly, the first-portion lower ledge 34 will extend outward from an assembled aircraft floorboard riser 12 to engage an adjacent floorboard 102, while the upper ledge 40 will extend inward from the assembled aircraft floorboard riser 12 to support a to-be-elevated floorboard 102 above the surface of the adjacent floorboard 102.

As schematically represented in FIG. 6, in some examples, the first-portion main body 32 may be described as comprising a first-portion upper edge 42, and the upper ledge 40 extends from the first-portion main body 32 from below the first-portion upper edge 42. Accordingly, a to-be-elevated floorboard 102 will be supported atop the upper ledge 40 and be restrained by the first-portion main body 32 from translating outward from its desired location when operatively atop an assembled aircraft floorboard riser 12. That is, the first-portion main body 32 serves to restrict an elevated floorboard 102 from sliding away from its intended placement of above a void 104 in an aircraft floor 100.

In some examples, the upper ledge 40 extends along a substantial length of the first-portion main body 32. Accordingly, a significant length of an elevated floorboard 102 will be supported directly by the upper ledge 40 when the aircraft floorboard riser 12 is operatively installed. Moreover, in examples where the first panel portion 16 and the second panel portion 20 are substantially the same length, due to the overlap between the first panel portion 16 and the second panel portion 20, the upper ledge 40 will span greater than 50% of an overall length of the riser panel 14. As a result, such a riser panel 14 will securely support an elevated floorboard 102.

As schematically represented in FIG. 6, in some examples, the first-portion main body 32 may be described as comprising a first-portion inner edge 44 that is opposite the first-panel-portion outer edge region 18 and that overlaps with the second panel portion 20. In such examples, the upper ledge 40 may extend to the first-portion inner edge 44. In other words, in such examples, the upper ledge 40 extends as far as possible toward the second-panel-portion outer edge region 22 to provide a significant support for an elevated floorboard 102.

With continued reference to FIG. 6, in some examples, the first-portion main body 32 defines a first-portion finger slit 46 that extends from the first-portion upper edge 42. Similarly, in some examples, a second-portion main body 50 of the second panel portion 20 defines a second-portion finger slit 54 extending from a second-portion upper edge 52 of the second-portion main body 50. When provided, the first-portion finger slit 46 and/or the second-portion finger slit 54 are sized to permit a user to extend a finger therethrough to engage an underside of an elevated floorboard 102 when supported by an assembled aircraft floorboard riser 12, such as to lift and remove the elevated floorboard 102.

As schematically illustrated in FIG. 6, in some examples, the first panel portion 16 comprises a first-portion handle 48 that extends upward from the first-portion upper edge 42. Similarly, in some examples, the second panel portion 20 comprises a second-portion handle 56 that extends upward from the second-portion upper edge 52. When present, the first-portion handle 48 and/or the second-portion handle 56 are configured to be selectively grasped by a user to operatively position the aircraft floorboard riser 12, such as during assembly and placement of an aircraft floorboard riser 12.

With continued reference to FIG. 6, in some examples of floorboard riser panels 14, the first-panel-portion outer edge region 18 comprises a first-panel-portion mating structure 58, the second-panel-portion outer edge region 22 comprises a second-panel-portion mating structure 60 that is configured to mate with the first-panel-portion mating structure 58 of another riser panel 14 for operative assembly of an aircraft floorboard riser 12. In some such examples, the second-panel-portion mating structure 60 is configured to mate with the first-panel-portion mating structure 58 of another riser panel 14 in a single angular orientation relative to the first-panel-portion mating structure 58, such as at a 90° angle. As discussed above and as schematically represented by the examples of in FIGS. 4 and 5, aircraft floorboard risers 12 may form right quadrilaterals. In other examples, the second-panel-portion mating structure 60 is configured to mate with the first-panel-portion mating structure 58 of another riser panel 14 in a plurality of angular orientations relative to the first-panel-portion mating structure 58, thereby permitting assembly of various polygonal shapes of aircraft floorboard risers 12.

In some examples and as schematically represented in FIG. 6, one of the first-panel-portion mating structure 58 or the second-panel-portion mating structure 60 comprises an elongate post 62, and the other of the first-panel-portion mating structure 58 or the second-panel-portion mating structure 60 comprises an elongate slot 64 that is configured to receive the elongate post 62 of another riser panel 14. In some such examples, the first-panel-portion mating structure and the second-panel-portion mating structure 60 of adjacent riser panels 14 may form a hinge. In some examples, the elongate post 62 may be shaped so as to not be permitted to rotate or pivot within the elongate slot 64.

With continued reference to FIG. 6, in some examples, the first panel portion 16 comprises a first-portion bore 66 and the second panel portion 20 comprises a second-portion bore 68 that is configured to be aligned with the first-portion bore 66 of another riser panel 14 when operatively coupled together. In such examples, modular aircraft floorboard riser systems 10 further comprise a plurality of pins 74, with each pin 74 being configured to selectively extend through the first-portion bore 66 of one riser panel 14 and the second-portion bore 68 of another riser panel 14 when operatively coupled together. In some such examples, the pins 74 may be configured with a detent, spring, and/or other structure that operatively retains the pins 74 once installed into the first-portion bore 66 and the second-portion bore 68 of adjacent riser panels 14, yet also permit for selective removal of the pins 74 such as with a user exerting above a threshold force to remove the pins 74. As a result, the pins 74 serve to restrict adjacent riser panels 14 from inadvertently separating until such time as a user chooses to disassemble an assembled aircraft floorboard riser 12.

As schematically represented in FIG. 6, in some examples, the second-panel-portion outer edge region 22 comprises a reinforced region 70 that is thicker than an adjacent region of the second panel portion 20. In such examples, reinforced region 70 provides additional material to support the interface between two adjacent riser panels 14 when an aircraft floorboard riser 12 is assembled and in use, such as with someone stepping atop a floorboard 102 elevated by the aircraft floorboard riser 12. Also, in some such examples, the second-portion bore 68 extends through the reinforced region 70. That is, the reinforced region 70 provides a thickness of material such that the second-portion bore 68 may be included in a riser panel 14, without an entirety of the second panel portion 20 requiring such thickness.

With continued reference to FIG. 6, in some examples, the second panel portion 20 comprises a second-portion lower ledge 72 that extends orthogonal from the second-portion main body 50 within the second-panel-portion outer edge region 22 in a direction opposite the first panel portion 16. In such examples, as with the first-portion lower ledge 34, the second-portion lower ledge 72 is configured to engage the upper surface of an adjacent floorboard 102 when the aircraft floorboard riser 12 is operatively installed. In such some examples, the second-portion lower ledge 72 is aligned with the first-portion lower ledge 34. In some examples, the reinforced region 70 comprises the second-portion lower ledge 72.

As also schematically represented in FIG. 6, in some examples, the second panel portion 20 comprises a second-portion tab 76 that extends parallel and downward from the second-portion main body 50. When present the second-portion tab 76 is configured to engage an edge of an adjacent floorboard 102 when the aircraft floorboard riser 12 is operatively installed. In some such examples, the second-portion tab 76 is aligned with the elongate tab 36. In some examples, the reinforced region 70 comprises the second-portion tab 76.

Figure 15:
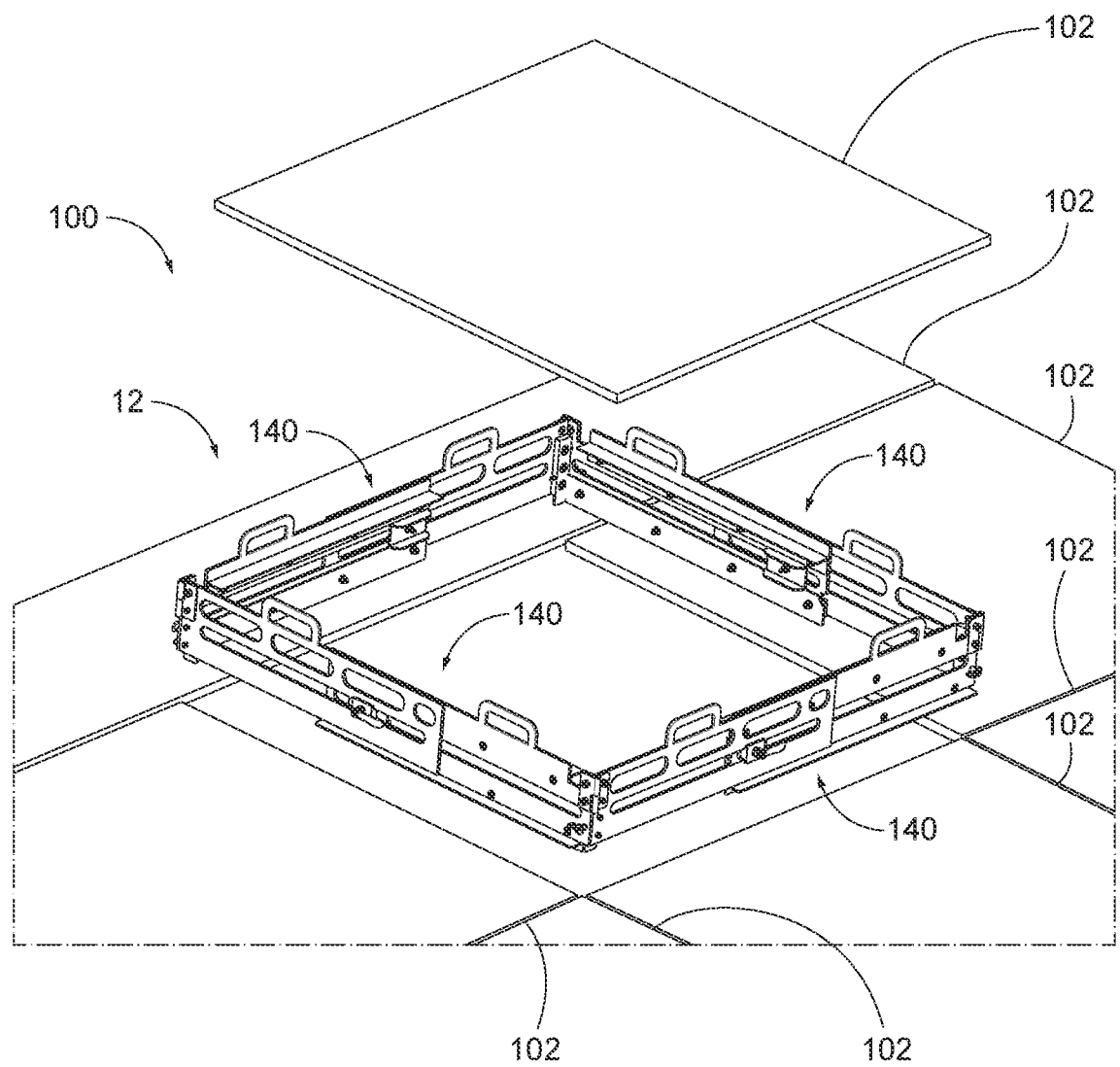
FIG. 15 is an isometric exploded view of an aircraft floor and an example aircraft floorboard riser assembled from four of the riser panels of FIG. 7.
Figure 16:
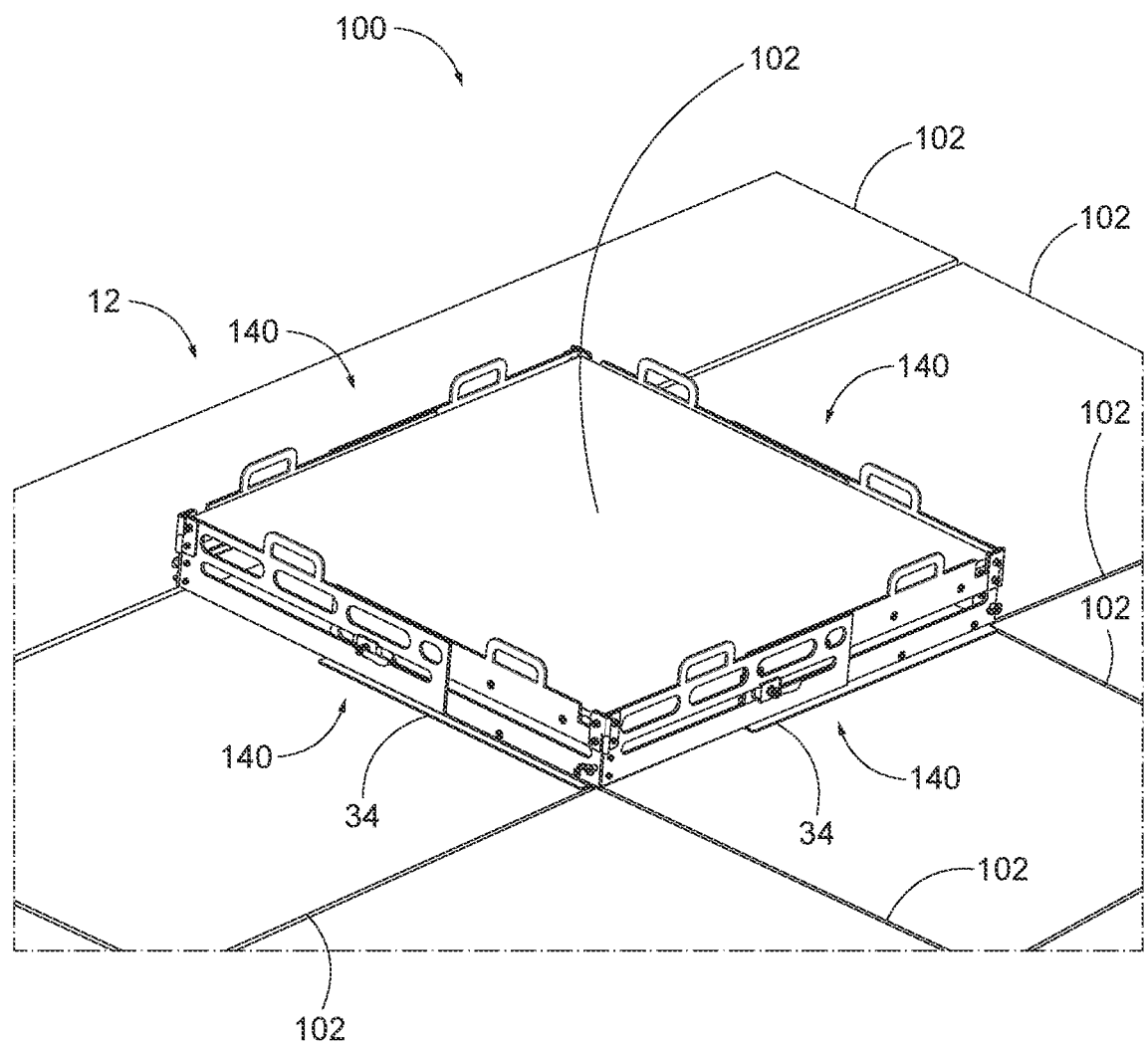
FIG. 16 is an isometric view of the aircraft floor and aircraft floorboard riser of FIG. 15 operatively elevating an aircraft floorboard.

Turning now to FIGS. 7-14, an illustrative non-exclusive example of riser panel 14 in the form of riser panel 140 is illustrated. In FIGS. 15 and 16, four riser panels 140 are illustrated operatively assembled into an aircraft floorboard riser 12 for elevating a floorboard 102. Where appropriate, the reference numerals from the schematic illustration of FIG. 6 are used to designate corresponding parts of the riser panel 140; however, the example of FIGS. 7-14 is non-exclusive and does not limit riser panels 14 to the illustrated embodiment of the riser panel 140. That is, riser panels 13 are not limited to the specific embodiment of the illustrated riser panel 140, and riser panels 14 may incorporate any number of the various aspects, configurations, characteristics, properties, etc. of riser panels 14 that are illustrated in and discussed with reference to the schematic representation of FIG. 6 and/or the embodiment of FIGS. 7-14, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the riser panel 140; however, it is within the scope of the present disclosure that the previously discussed features, variants, etc. may be utilized with the riser panel 140.

As seen, the riser panel 140 is an example of a riser panel 14, whose first panel portion 16 defines a first-portion longitudinal channel 26 that second panel portion 20 defines a second-portion longitudinal channel 28. The riser panel 140 comprises a clamp 24 that extends through the first-portion longitudinal channel 26 and the second-portion longitudinal channel 28 and comprises a cam lever assembly 30. The first panel portion 16 of the riser panel 140 comprises a T-extrusion 38 that defines first-portion lower ledge 34 and an elongate tab 36, both of which extend along a substantial length of the first-portion main body 32. The first panel portion 16 of the riser panel 140 also comprises an upper ledge 40 that extends a substantial length of the first-portion main body 32 from an opposite side of the first-portion main body 32 from, and spatially above, the first-portion lower ledge 34. The first panel portion 16 comprises a first-portion handle 48, and the first-portion main body 32 defines a first-portion finger slit 46. The second panel portion 20 comprises of the riser panel 140 comprises a second-portion handle 56. The first-panel-portion mating structure 58 comprises an elongate post 62, and the second-panel-portion mating structure 60 comprises an elongate slot 64. As perhaps best seen in FIG. 8, the second panel portion 20 comprises a reinforced region 70 that defines a second-portion bore 68 and a second-portion tab 76 aligned with the elongate tab 36 of the first panel portion 16. The first panel portion 16 defines a corresponding first-portion bore 66, with the first-portion bore 66 and the second-portion bore 68 being sized to receive an associated pin 74.

As illustrated in FIGS. 15 and 16, four riser panels 140 may be operatively assembled into an aircraft floorboard riser 12 to operatively elevate a floorboard 102 above adjacent floorboards—in particular, by fitting within the floor opening in which the floorboard 102 sits and supporting the floorboard 102 above it.

Figure 17:
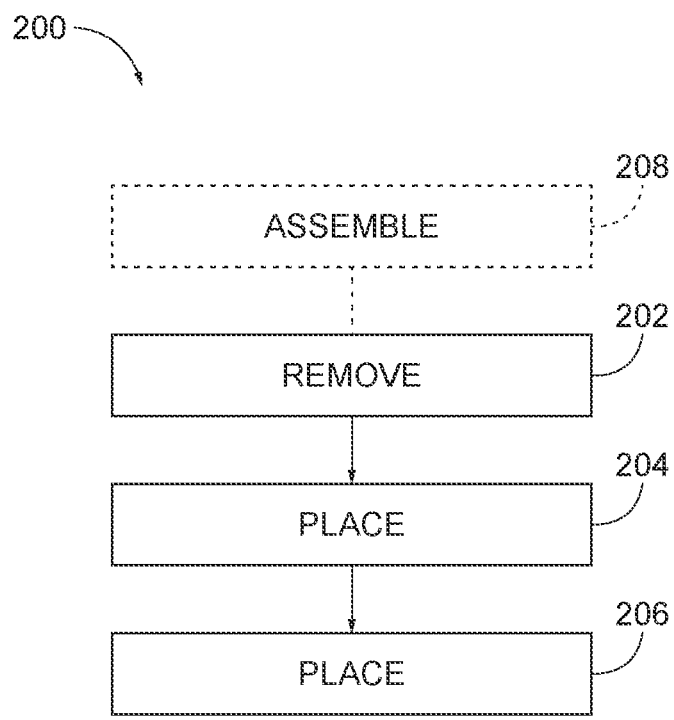
FIG. 17 is a flowchart schematically representing methods according to the present disclosure.

FIG. 17 schematically provides a flowchart that represents illustrative, non-exclusive examples of methods 200 according to the present disclosure. In FIG. 17, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 17 are not limiting and other methods and steps are within the scope of the present disclosure, including methods having greater than or fewer than the number of steps illustrated, as understood from the discussions herein.

As schematically represented in FIG. 17, methods 200 comprise at least removing 202 a to-be-elevated floorboard 102 of an aircraft floor 100 to create a void 104; following the removing 202, operatively placing 204 an aircraft floorboard riser 12 in engagement with floorboards 102 adjacent to the void 104; and following the operatively placing 204, operatively placing 206 the to-be-elevated floorboard 102 atop the aircraft floorboard riser 12. Some methods 200 further comprise assembling 208 the aircraft floorboard riser 12 from a modular aircraft floorboard riser system 10 according to the present disclosure.

Illustrative, non-exclusive examples of inventive subject matter according to the present disclosure are described in the following enumerated paragraphs:

A. A modular aircraft floorboard riser system (10) for assembling an aircraft floorboard riser (12) for operatively elevating a to-be-elevated floorboard (102) above adjacent floorboards (102) of an aircraft floor (100), the modular aircraft floorboard riser system (10) comprising:

a plurality of riser panels (14), wherein each riser panel (14) of the plurality of riser panels (14) comprises:
a first panel portion (16) having a first-panel-portion outer edge region (18); and
a second panel portion (20) slidingly coupled to the first panel portion (16) and having a second-panel-portion outer edge region (22) opposite the first-panel-portion outer edge region (18);
wherein the first-panel-portion outer edge region (18) of each riser panel (14) is configured to be selectively coupled to the second-panel-portion outer edge region (22) of another riser panel (14); and
wherein a selection of the plurality of riser panels (14) is configured to be operatively assembled into the aircraft floorboard riser (12) having a polygonal shape.

A1. The modular aircraft floorboard riser system (10) of paragraph A, wherein the first-panel-portion outer edge region (18) of each riser panel (14) is configured to be selectively coupled to the second-panel-portion outer edge region (22) of another riser panel (14) at plurality of angles.

A2. The modular aircraft floorboard riser system (10) of paragraph A, wherein the first-panel-portion outer edge region (18) of each riser panel (14) is configured to be selectively coupled to the second-panel-portion outer edge region (22) of another riser panel (14) at a single angle, optionally at a right angle (90°).

A3. The modular aircraft floorboard riser system (10) of any of paragraphs A-A2, wherein each riser panel (14) of the plurality of riser panels (14) further comprises a clamp (24) configured to selectively fix the second panel portion (20) relative to the first panel portion (16).

A3.1. The modular aircraft floorboard riser system (10) of paragraph A3,
wherein the first panel portion (16) defines a first-portion longitudinal channel (26);
wherein the second panel portion (20) defines a second-portion longitudinal channel (28) parallel to the first-portion longitudinal channel (26); and
wherein the clamp (24) extends through the first-portion longitudinal channel (26) and the second-portion longitudinal channel (28) and engages opposing sides of the first panel portion (16) and the second panel portion (20).

A3.2. The modular aircraft floorboard riser system (10) of any of paragraphs A3-A3.1, wherein the clamp (24) comprises a cam lever assembly (30).

A4. The modular aircraft floorboard riser system (10) of any of paragraphs A-3.2, wherein the first panel portion (16) comprises:
a first-portion main body (32) that is planar and substantially parallel to the second panel portion (20); and
a first-portion lower ledge (34) extending orthogonal from the first-portion main body (32) and extending below the second panel portion (20), wherein the first-portion lower ledge (34) is configured to engage an upper surface of one of the adjacent floorboards (102) when the aircraft floorboard riser (12) is operatively installed.

A4.1. The modular aircraft floorboard riser system (10) of paragraph A4, wherein the first-portion lower ledge (34) extends along a substantial length of the first-portion main body (32).

A5. The modular aircraft floorboard riser system (10) of any of paragraphs A-A4.1, wherein the first panel portion (16) comprises:

a/the first-portion main body (32) that is planar and substantially parallel to the second panel portion (20); and an elongate tab (36) extending parallel and downward from the first-portion main body (32), wherein the elongate tab (36) is configured to engage an edge of one of the adjacent floorboards (102) when the aircraft floorboard riser (12) is operatively installed.

A5.1. The modular aircraft floorboard riser system (10) of paragraph A5 when depending from paragraph A4, wherein the first-portion lower ledge (34) and the elongate tab (36) are integral with each other and are operatively coupled to the first-portion main body (32).

A5.1.1. The modular aircraft floorboard riser system (10) of paragraph A5.1, wherein the first-portion lower ledge (34) and the elongate tab (36) comprise a T-extrusion (38) that is operatively coupled to the first-portion main body (32).

A6. The modular aircraft floorboard riser system (10) of any of paragraphs A-A5.1.1, wherein the first panel portion (16) comprises:

a/the first-portion main body (32) that is planar and substantially parallel to the second panel portion (20); and an upper ledge (40) extending orthogonal from the first-portion main body (32), wherein the upper ledge (40) is configured to engage and support the to-be-elevated floorboard (102).

A6.1. The modular aircraft floorboard riser system (10) of paragraph A6 when depending from paragraph A4, wherein the upper ledge (40) and the first-portion lower ledge (34) extend from opposite sides of the first-portion main body (32), and wherein the upper ledge (40) is positioned spatially above the first-portion lower ledge (34).

A6.2. The modular aircraft floorboard riser system (10) of any of paragraphs A6-A6.1, wherein the first-portion main body (32) comprises a first-portion upper edge (42), and wherein the upper ledge (40) extends from the first-portion main body (32) from below the first-portion upper edge (42).

A6.3. The modular aircraft floorboard riser system (10) of any of paragraphs A6-A6.2, wherein the upper ledge (40) extends along a substantial length of the first-portion main body (32).

A6.4. The modular aircraft floorboard riser system (10) of any of paragraphs A6-A6.3, wherein the first-portion main body (32) comprises a first-portion inner edge (44) opposite the first-panel-portion outer edge region (18) and that overlaps with the second panel portion (20), and wherein the upper ledge (40) extends to the first-portion inner edge (44).

A7. The modular aircraft floorboard riser system (10) of any of paragraphs A-A6.4, wherein the first panel portion (16) comprises a/the first-portion main body (32), wherein the first-portion main body (32) comprises a/the first-portion upper edge (42), wherein the first-portion main body (32) defines a first-portion finger slit (46) extending from the first-portion upper edge (42), and wherein the first-portion finger slit (46) is sized to permit a user to extend a finger through the first-portion finger slit (46) to engage an underside of the to-be-elevated floorboard (102) when the to-be-elevated floorboard (102) is operatively supported by the aircraft floorboard riser (12).

A8. The modular aircraft floorboard riser system (10) of any of paragraphs A-A7, wherein the first panel portion (16) comprises a/the first-portion main body (32), wherein the first-portion main body (32) comprises a/the first-portion upper edge (42), wherein the first panel portion (16) comprises a first-portion handle (48) extending upward from the first-portion upper edge (42), and wherein the first-portion handle (48) is configured to permit a/the user to selectively grasp the first-portion handle (48) to operatively position the aircraft floorboard riser (12).

A9. The modular aircraft floorboard riser system (10) of any of paragraphs A-A8, wherein the second panel portion (20) comprises a second-portion main body (50), wherein the second-portion main body (50) comprises a second-portion upper edge (52), wherein the second-portion main body (50) defines a second-portion finger slit (54) extending from the second-portion upper edge (52), and wherein the second-portion finger slit (54) is sized to permit a/the user to extend a/the finger through the second-portion finger slit (54) to engage an/the underside of the to-be-elevated floorboard (102) when the to-be-elevated floorboard (102) is operatively supported by the aircraft floorboard riser (12).

A10. The modular aircraft floorboard riser system (10) of any of paragraphs A-A9, wherein the second panel portion (20) comprises a/the second-portion main body (50), wherein the second-portion main body (50) comprises a/the second-portion upper edge (52), wherein the second panel portion (20) comprises a second-portion handle (56) extending upward from the second-portion upper edge (52), and wherein the second-portion handle (56) is configured to permit a/the user to selectively grasp the second-portion handle (56) to operatively position the aircraft floorboard riser (12).

A11. The modular aircraft floorboard riser system (10) of any of paragraphs A-A10, wherein the first-panel-portion outer edge region (18) comprises a first-panel-portion mating structure (58); and wherein the second-panel-portion outer edge region (22) comprises a second-panel-portion mating structure (60) that is configured to mate with the first-panel-portion mating structure (58) of another riser panel (14) for operative assembly of the aircraft floorboard riser (12).

A11.1. The modular aircraft floorboard riser system (10) of paragraph A11, wherein the second-panel-portion mating structure (60) is configured to mate with the first-panel-portion mating structure (58) of another riser panel (14) in a single angular orientation relative to the first-panel-portion mating structure (58), optionally at a 90° angle.

A11.2. The modular aircraft floorboard riser system (10) of paragraph A11, wherein the second-panel-portion mating structure (60) is configured to mate with the first-panel-portion mating structure (58) of another riser panel (14) in a plurality of angular orientations relative to the first-panel-portion mating structure (58).

A11.3. The modular aircraft floorboard riser system (10) of any of paragraphs A11-A11.2, wherein one of the first-panel-portion mating structure (58) or the second-panel-portion mating structure (60) comprises an elongate post (62), and wherein the other of the first-panel-portion mating structure (58) or the second-panel-portion mating structure (60) comprises an elongate slot (64) that is configured to receive the elongate post (62) of another riser panel (14).

A12. The modular aircraft floorboard riser system (10) of any of paragraphs A-A11.3, wherein the first panel portion (16) comprises a first-portion bore (66), and wherein the second panel portion (20) comprises a second-portion bore (68) that is configured to be aligned with the first-portion bore (66) of another riser panel (14) when operatively coupled together; and wherein the modular aircraft floorboard riser system (10) further comprises a plurality of pins (74), wherein each pin (74) of the plurality of pins (74) is configured to selectively extend through the first-portion bore (66) of one riser panel (14) and the second-portion bore (68) of another riser panel (14) when operatively coupled together.

A13. The modular aircraft floorboard riser system (10) of any of paragraphs A-A12, wherein the second-panel-portion outer edge region (22) comprises a reinforced region (70) that is thicker than an adjacent region of the second panel portion (20).

A13.1. The modular aircraft floorboard riser system (10) of paragraph A13 when depending from paragraph A12, wherein the second-portion bore (68) extends through the reinforced region (70).

A14. The modular aircraft floorboard riser system (10) of any of paragraphs A-A13.1, wherein the second panel portion (20) comprises:

a/the second-portion main body (50) that is planar and substantially parallel to the first panel portion (16); and a second-portion lower ledge (72) extending orthogonal from the second-portion main body (50) within the second-panel-portion outer edge region (22) in a direction opposite the first panel portion (16), wherein the second-portion lower ledge (72) is configured to engage an/the upper surface of one of the adjacent floorboards (102) when the aircraft floorboard riser (12) is operatively installed.

A14.1. The modular aircraft floorboard riser system (10) of paragraph A14 when depending from paragraph A4, wherein the second-portion lower ledge (72) is aligned with the first-portion lower ledge (34).

A14.2. The modular aircraft floorboard riser system (10) of any of paragraphs A14-A14.1 when depending from paragraph A13, wherein the reinforced region (70) comprises the second-portion lower ledge (72).

A15. The modular aircraft floorboard riser system (10) of any of paragraphs A-A14.2, wherein the second panel portion (20) comprises:

a/the second-portion main body (50) that is planar and substantially parallel to the first panel portion (16); and a second-portion tab (76) extending parallel and downward from the second-portion main body (50), wherein the second-portion tab (76) is configured to engage an/the edge of one of the adjacent floorboards (102) when the aircraft floorboard riser (12) is operatively installed.

A15.1. The modular aircraft floorboard riser system (10) of paragraph A15 when depending from paragraph A5, wherein the second-portion tab (76) is aligned with the elongate tab (36).

A15.2. The modular aircraft floorboard riser system (10) of paragraph A15 when depending from paragraph A13, wherein the reinforced region (70) comprises the second-portion tab (76).

B. An aircraft floorboard riser (12) assembled from a selection of the plurality of riser panels (14) of the modular aircraft floorboard riser system (10) of any of paragraphs A-A15.2, wherein the first-panel-portion outer edge region (18) of each of the selection of the plurality of riser panels (14) is operatively coupled to the second-panel-portion outer edge region (22) of an adjacent one of the selection of the plurality of riser panels (14).

B1. The aircraft floorboard riser (12) of paragraph B, wherein the selection of the plurality of riser panels (14) comprises at least four riser panels (14), optionally consists of four riser panels (14).

C. A method (200), comprising:

removing (202) a to-be-elevated floorboard (102) of an aircraft floor (100) to create a void (104);

following the removing (202), operatively placing (204) an aircraft floorboard riser (12) in engagement with floorboards (102) adjacent to the void (104); and following the operatively placing (204), operatively placing (206) the to-be-elevated floorboard (102) atop the aircraft floorboard riser (12).

C1. The method (200) of paragraph C, further comprising:

assembling the aircraft floorboard riser (12) from the modular aircraft floorboard riser system (10) of any of paragraphs A-A15.2.

D. The use of the modular aircraft floorboard riser system (10) of any of paragraphs A-A15.2 to elevate the to-be-elevated floorboard (102) above the adjacent floorboards (102) of the aircraft floor (100).

Unless otherwise defined herein, as used herein, "substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A modular aircraft floorboard riser system for assembling an aircraft floorboard riser for operatively elevating a to-be-elevated floorboard above adjacent floorboards of an aircraft floor, the modular aircraft floorboard riser system comprising:
a plurality of riser panels, wherein each riser panel of the plurality of riser panels comprises:
a first panel portion having a first-panel-portion outer edge region; and
a second panel portion slidingly coupled to the first panel portion and having a second-panel-portion outer edge region opposite the first-panel-portion outer edge region;
wherein the first-panel-portion outer edge region of each riser panel is configured to be selectively coupled to the second-panel-portion outer edge region of another riser panel; and
wherein a selection of the plurality of riser panels is configured to be operatively assembled into the aircraft floorboard riser having a polygonal shape.

2. The modular aircraft floorboard riser system of claim 1, wherein the first-panel-portion outer edge region of each riser panel is configured to be selectively coupled to the second-panel-portion outer edge region of another riser panel at plurality of angles.

3. The modular aircraft floorboard riser system of claim 1, wherein the first-panel-portion outer edge region of each riser panel is configured to be selectively coupled to the second-panel-portion outer edge region of another riser panel at a single angle, optionally at a right angle (90°).

4. The modular aircraft floorboard riser system of claim 1, wherein each riser panel of the plurality of riser panels further comprises a clamp configured to selectively fix the second panel portion relative to the first panel portion.

5. The modular aircraft floorboard riser system of claim 4, wherein the first panel portion defines a first-portion longitudinal channel;
wherein the second panel portion defines a second-portion longitudinal channel parallel to the first-portion longitudinal channel; and
wherein the clamp extends through the first-portion longitudinal channel and the second-portion longitudinal channel and engages opposing sides of the first panel portion and the second panel portion.

6. The modular aircraft floorboard riser system of claim 1, wherein the first panel portion comprises:
a first-portion main body that is planar and substantially parallel to the second panel portion; and
a first-portion lower ledge extending orthogonal from the first-portion main body and extending below the second panel portion, wherein the first-portion lower ledge is configured to engage an upper surface of one of the adjacent floorboards when the aircraft floorboard riser is operatively installed.

7. The modular aircraft floorboard riser system of claim 6, wherein the first-portion lower ledge extends along a substantial length of the first-portion main body.

8. The modular aircraft floorboard riser system of claim 1, wherein the first panel portion comprises:
a first-portion main body that is planar and substantially parallel to the second panel portion; and
an elongate tab extending parallel and downward from the first-portion main body, wherein the elongate tab is configured to engage and an edge of one of the adjacent floorboards when the aircraft floorboard riser is operatively installed.

9. The modular aircraft floorboard riser system of claim 8, wherein the first panel portion further comprises:
a first-portion main body that is planar and substantially parallel to the second panel portion; and
a first-portion lower ledge extending orthogonal from the first-portion main body and extending below the second panel portion, wherein the first-portion lower ledge is configured to engage an upper surface of one of the adjacent floorboards when the aircraft floorboard riser is operatively installed;
wherein the first-portion lower ledge and the elongate tab are integral with each other and are operatively coupled to the first-portion main body.

10. The modular aircraft floorboard riser system of claim 1, wherein the first panel portion comprises:
a first-portion main body that is planar and substantially parallel to the second panel portion;
an upper ledge extending orthogonal from the first-portion main body, wherein the upper ledge is configured to engage and support the to-be-elevated floorboard.

11. The modular aircraft floorboard riser system of claim 10, wherein the first panel portion further comprises:
a first-portion lower ledge extending orthogonal from the first-portion main body and extending below the second panel portion, wherein the first-portion lower ledge is configured to engage an upper surface of one of the adjacent floorboards when the aircraft floorboard riser is operatively installed;
wherein the upper ledge and the first-portion lower ledge extend from opposite sides of the first-portion main body, and wherein the upper ledge is positioned spatially above the first-portion lower ledge.

12. The modular aircraft floorboard riser system of claim 10, wherein the first-portion main body comprises a first-portion upper edge, and wherein the upper ledge extends from the first-portion main body from below the first-portion upper edge.

13. The modular aircraft floorboard riser system of claim 10, wherein the upper ledge extends along a substantial length of the first-portion main body.

14. The modular aircraft floorboard riser system of claim 10, wherein the first-portion main body comprises a first-portion inner edge opposite the first-panel-portion outer edge region and that overlaps with the second panel portion, and wherein the upper ledge extends to the first-portion inner edge.

15. The modular aircraft floorboard riser system of claim 1, wherein the first panel portion comprises a first-portion main body, wherein the first-portion main body comprises a first-portion upper edge, wherein the first-portion main body defines a first-portion finger slit extending from the first-portion upper edge, and wherein the first-portion finger slit is sized to permit a user to extend a finger through the first-portion finger slit to engage an underside of the to-be-elevated floorboard when the to-be-elevated floorboard is operatively supported by the aircraft floorboard riser.

16. The modular aircraft floorboard riser system of claim 1, wherein the first panel portion comprises a first-portion main body, wherein the first-portion main body comprises a first-portion upper edge, wherein the first panel portion comprises a first-portion handle extending upward from the first-portion upper edge, and wherein the first-portion handle is configured to permit a user to selectively grasp the first-portion handle to operatively position the aircraft floorboard riser.

17. The modular aircraft floorboard riser system of claim 1, wherein the second panel portion comprises a second-portion main body, wherein the second-portion main body comprises a second-portion upper edge, wherein the second-portion main body defines a second-portion finger slit extending from the second-portion upper edge, and wherein the second-portion finger slit is sized to permit a user to extend a finger through the second-portion finger slit to engage an underside of the to-be-elevated floorboard when the to-be-elevated floorboard is operatively supported by the aircraft floorboard riser.

18. The modular aircraft floorboard riser system of claim 1, wherein the second panel portion comprises a second-portion main body, wherein the second-portion main body comprises a second-portion upper edge, wherein the second panel portion comprises a second-portion handle extending upward from the second-portion upper edge, and wherein the second-portion handle is configured to permit a user to selectively grasp the second-portion handle to operatively position the aircraft floorboard riser.

19. The modular aircraft floorboard riser system of claim 1, wherein the first-panel-portion outer edge region comprises a first-panel-portion mating structure;

wherein the second-panel-portion outer edge region comprises a second-panel-portion mating structure that is configured to mate with the first-panel-portion mating structure of another riser panel for operative assembly of the aircraft floorboard riser; and wherein the second-panel-portion mating structure is configured to mate with the first-panel-portion mating structure of another riser panel in a single angular orientation relative to the first-panel-portion mating structure.

20. The modular aircraft floorboard riser system of claim 1, wherein the first panel portion comprises a first-portion bore, and wherein the second panel portion comprises a second-portion bore that is configured to be aligned with the first-portion bore of another riser panel when operatively coupled together; and wherein the modular aircraft floorboard riser system further comprises a plurality of pins, wherein each pin of the plurality of pins is configured to selectively extend through the first-portion bore of one riser panel and the second-portion bore of another riser panel when operatively coupled together.

21. An aircraft floorboard riser assembled from a selection of the plurality of riser panels of the modular aircraft floorboard riser system of claim 1, wherein the first-panel-portion outer edge region of each of the selection of the plurality of riser panels is operatively coupled to the second-panel-portion outer edge region of an adjacent one of the selection of the plurality of riser panels.

* * * * *